2,793,181

ELECTROLYTIC REGENERATION OF ALKYLATION SULFURIC ACID

Naima Visnapuu, Cleveland, Ohio, assignor to The Standard Oil Company, Cleveland, Ohio, a corporation of Ohio No Drawing. Application July 16, 1953,
Serial No. 368,540

2 Claims. (Cl. 204—130)

The present invention relates to an improved method for the regeneration of spent sulfuric acid from the alkylation of hydrocarbons.

The alkylation of isoparaffins with olefins to produce "alkylate" gasoline using concentrated sulfuric acid as a catalyst is a commercial process which has found wide use in the petroleum industry. In a typical alkylation process, isoparaffins and olefins in the liquid phase are contacted with concentrated sulfuric acid of approximately 98% strength. The hydrocarbon and the acid phases are separated and the acid is reused. During repeated reuse in the process, the acid becomes "spent" and when the concentration of the acid falls to 85 to 90% concentration, or at the lowest 80% concentration, it becomes necessary to withdraw the spent acid and supply fresh acid to the reaction. The spent acid is a more or less standardized material which varies but very little in composition between different alkylation plants. Many authorities believe that the acid becomes spent because of the fact that the olefins in the alkylation feed are dehydrogenated to more unsaturated compounds which are soluble in the sulfuric acid phase and which dilute the acid catalyst. Whether or not this is a true explanation of how the acid becomes spent, it is known that the spent acid is a mixture of at least 80% sulfuric acid with the balance primarily various hydrocarbon contaminants and with a small amount of water in the acid phase. At least part of the hydrocarbon contaminants is thought to exist in the form of an acid-hydrocarbon complex in the acid phase. Although its composition is not precisely known, "spent alkylation sulfuric acid" is well-known in the industry by that name and those skilled in the art are well aware of its identity and characteristics.

Since the disposal of the spent acid is troublesome and uneconomical, the problem of regenerating the spent acid has received serious consideration in the past, and many methods have been devised for the regeneration of the acid. As examples of these prior art methods of regeneration, reference is made to U. S. Patent No. 2,015,254 which describes a method of regenerating the spent acid which comprises oxidizing the impurities by air. In U. S. Patent No. 2,287,732 the spent acid is chilled and thereafter the impurities may be removed by decanting. In U. S. Patent No. 2,418,210 the acid is regenerated by heating to form a coke out of the impurities which may then be mechanically separated. In U. S. Patent No. 2,588,331 regeneration is accomplished by sulfonation of the spent acid at high temperatures to form $SO_2$ and $CO_2$ and thereby remove the impurities.

In contrast to the prior art methods for the regeneration of spent alkylation sulfuric acid, the method of the present invention involves the regeneration of the spent alkylation acid by electrolysis.

In U. S. Patent No. 1,630,074 to Rogers et al., there is described a method for removing organic matter from refinery sludge acids by electrolysis of the acid in a diaphragmless cell. It is stated in that patent that the acid is preferably diluted to 35 to 45° Baumé by the addition of water or more dilute sludge acids and that the electrolytic process is accelerated by heating the sludge acid to a temperature of at least 100° F. The effect of the electrolysis, according to the patentees, is to cause oxidation and coagulation of the organic matter which is carried to the surface of the acid where it can be removed. There is not obtained according to this method any increase in the concentration of the acid.

In copending application Serial No. 350,097, filed April 21, 1953, there is disclosed and claimed a method for the regeneration of spent alkylation sulfuric acid which comprises electrolyzing the acid in a compartmented electrolytic cell, i. e., one separated into compartments by a permeable diaphragm, and recovering reconcentrated and purified acid from the anode compartment of said cell and recovering waste acid from the cathode compartment of the cell. In that application it is stated that high temperatures during electrolysis cause excessive foaming of the acid and that for this reason the temperature preferably should not exceed about 70° F.

In copending application Serial No. 368,509 filed July 16, 1953 there is disclosed and claimed a process for the regeneration of spent alkylation sulfuric acid which constitutes an improvement over the method described in the aforesaid application Serial No. 350,097, filed April 21, 1953. In that improved process, the spent alkylation acid is electrolyzed in a compartmented electrolytic cell at an initial temperature not exceeding about 80° F. and thereafter the temperature is raised.

The present invention constitutes an improvement over both of the processes described in the aforesaid applications. In accordance with the present invention, it has been found that, in the electrolysis of spent alkylation sulfuric acid in a compartmented electrolytic cell, the time necessary to obtain the desired reconcentration of the acid can be materially reduced by maintaining the anode compartment of the electrolytic cell at least about 15° F. higher than the temperature of the acid in the cathode compartment. Generally, the temperature differential will not exceed about 75° F. and a differential of about 15° to 30° F. is preferred.

The process of the present invention is applicable to processes of either of the types disclosed in the aforesaid copending applications. In other words, the present process can be performed by maintaining the respective temperatures of the acid in the anode and cathode compartments constant throughout the electrolysis as in application Serial No. 350,097, filed April 21, 1953, or relatively low initial temperatures may be employed and thereafter the temperatures can be raised as in the process described in application Serial No. 368,509, filed July 16, 1953, while maintaining a temperature differential between the cells.

In order to avoid the difficulties arising from foaming and sludging it is recommended in the present process that the initial temperatures of the electrolysis not exceed about 60° F. in the cathode compartment and about 90° F. in the anode compartment. Thereafter, if it is desired to obtain the maximum benefits of the invention, the temperature can be raised either gradually or stepwise in each compartment in accordance with the teachings of co-pending application Serial No. 368,509, filed July 16, 1953.

The electrolytic cell employed in the present process is of conventional design and comprises an anode compartment and a cathode compartment with a diaphragm separating the two compartments. Materials of which suitable diaphragms can be made include, for example, sheets of porous clay, fiberglass mats, asbestos mats and Alundum-Carborundum plates. Further description of cells of this type may be found in copending application Serial No. 350,097, filed April 21, 1953.

The anode of the electrolytic cell should be a material which is resistant to oxidation by sulfuric acid, which is insoluble in sulfuric acid, and which does not polarize under the electrolyzing conditions. Anodes of platinum have been found especially desirable and to a lesser extent, palladium anodes. On the other hand, the material employed in the construction of the cathode is not at all critical and among the materials which have been tried and found successful are included lead, copper, mercury, graphite, nickel and platinum. In addition to these materials, it is possible to employ for the cathode any other material which is commonly employed in the construction of electrodes for electrolytic cells. The electrolytic cell in the present invention should also be provided with means in each compartment for cooling and heating, for example, a water jacket or similar device.

In the operation of the process of this invention, spent acid from an alkylation plant is introduced into the electrolytic cell in an amount sufficient to submerge the electrodes of both compartments of the cell. A temperature differential is then established between the cells, and thereafter a direct current is passed between the electrodes and the electrolysis is allowed to proceed until the acid in the anode compartment has been reconcentrated sufficiently to enable it to be reemployed in the alkylation process. The concentration of the acid in each of the cells may be determined from time to time by withdrawing small samples and titrating with a standardized base or by measuring the acidity. After the electrolysis has been allowed to proceed for a length of time, it is found that the concentration of the acid in the anode compartment is increased while the concentration of the acid in the cathode compartment ordinarily decreases. During the electrolysis, gas is liberated at the anode and the cathode. At this point the acid can be withdrawn, that from the anode compartment being recycled for use in an alkylation plant. The free sulfur in the cathode compartment can be recovered, and the balance sent to waste or further recovery processes. It is to be observed that in this manner more than half of the acid contained in the original spent acid can be recovered and reused.

The operation just described can, of course, be modified as previously explained by increasing the temperature of each cell during the process while maintaining the temperature differential between the cells.

The following examples are given in order to illustrate the practice of the process of this invention and its advantages.

EXAMPLE 1

The electrolytic cell employed in this example was formed of two compartments separated by a porous glass diaphragm. The anode was composed of platinum and the cathode composed of lead. A hollow coil adapted for the circulation of either hot water or cold water was placed in each of the compartments.

In starting operation each compartment was filled with approximately 250 ml. of spent alkylation sulfuric acid having a concentration of about 87.4%. Cold water was run through the cooling coil in the cathode compartment and hot water was run through the heating coil of the anode compartment until the temperature of the acid in the cathode compartment was 60° F. and the temperature of the acid in the anode compartment, 90° F. There was then impressed between the electrodes a voltage sufficient to supply 1.5 amperes and the electrolysis was allowed to proceed without changing the temperature in either compartment for a total of 93 hours. During this time samples of acid were drawn at periodic intervals from each of the compartments and analyzed for the concentration of acid. The results of this experiment are tabulated below:

*Table I*

| Hours | Temp., °F. | | Acidity | |
|---|---|---|---|---|
| | Anode | Cathode | Anode | Cathode |
| 5 | 80–95 | 55–60 | 87.8 | |
| 20 | 93 | 58 | 89.7 | 81.7 |
| 45 | 93 | 58 | 89.9 | |
| 69 | 94 | 60 | 91.7 | 78.0 |
| 77 | 95 | 60 | 92.6 | |
| 93 | 96 | 66 | 95.3 | 76.6 |

EXAMPLE 2

The procedure of Example 1 was followed in electrolyzing a sample of the same spent alkylation sulfuric acid, with the exception that in this example the temperature of the acid in the cathode compartment was maintained at approximately 65° F. and the temperature of the acid in the anode compartment was maintained at approximately 15 to 20° F. higher than the temperature in the cathode compartment. The results of this example are tabulated below:

*Table II*

| Hours | Temp., °F. | | Acidity | |
|---|---|---|---|---|
| | Anode | Cathode | Anode | Cathode |
| 21 | 89 | 65 | 88.5 | 82.8 |
| 30 | 92 | 68 | 88.9 | 82.1 |
| 48 | 87 | 67 | 90.0 | 80.2 |
| 70 | 79 | 63 | 90.4 | 78.8 |
| 77 | 79 | 63 | 90.8 | 78.4 |
| 141 | 92 | 68 | 96.0 | 77.6 |

From the results of Examples 1 and 2 it is readily apparent that relatively rapid concentration of the acid in the anode compartment is obtained by the practice of this invention.

EXAMPLE 2A

The procedure of Example 1 was followed in electrolyzing a sample of the same spent alkylation sulfuric acid, with the exception that the temperature of the acid in the anode compartment was maintained between 60 and 78° F. and the temperature of the acid in the cathode compartment was maintained approximately 5 to 8° F. higher. The results of this experiment are tabulated below:

*Table III*

| Hours | Temp., °F. | | Acidity | |
|---|---|---|---|---|
| | Anode | Cathode | Anode | Cathode |
| 15 | 60–74 | 66–81 | 88.8 | 85.4 |
| 23 | 78–70 | 82–78 | 89.4 | 83.4 |
| 40 | 72 | 76 | 90.2 | 81.3 |
| 64 | 65 | 72 | 90.8 | 80.9 |
| 136 | 66 | 74 | 92.7 | 79.4 |
| 162 | 74 | 80 | 94.0 | 78.8 |
| 208 | 63 | 68 | 95.7 | 78.5 |
| 232 | 61 | 66 | 97.2 | 78.5 |

EXAMPLE 3

Again the procedure of Example 1 was followed, except that in this experiment it was attempted to maintain the temperature of the anode and cathode at approximately the same level. The results of this example are as follows:

Table IV

| Hours | Temp., ° F. | | Acidity | |
|---|---|---|---|---|
| | Anode | Cathode | Anode | Cathode |
| 65 | 62 | 58 | 89.4 | 80.9 |
| 73 | 66 | 63 | 90.4 | 80.5 |
| 89 | 65 | 62 | 90.8 | 80.3 |
| 98 | 65 | 63 | 91.2 | 80.0 |
| 113 | 68 | 64 | 91.4 | 79.7 |
| 121 | 65 | 62 | 92.1 | 80.1 |
| 162 | 62 | 58 | 93.7 | 79.5 |
| 168 | 65 | 61 | 94.2 | 78.8 |
| 240 | 64 | 60 | 100.1 | 78.5 |

From the foregoing examples, it is readily apparent that operation with the temperature of the acid in the anode compartment approximately 15 to 30° F. higher than the temperature in the cathode compartment results in a much faster electrolysis than when the temperature in the cathode compartment is higher than the temperature in the anode compartment. Specifically, in Example 1 with the anode temperature 30 degrees higher than the cathode temperature, about 93 hours were required to reach an acid concentration in the anode compartment of about 95%. In Example 2 operation with the anode temperature about 15 to 20° F. higher than the cathode temperature required about 141 hours to reach an acid concentration of about 96%. In Example 2A, with the cathode temperature 5 to 8° F. higher than the anode temperature about 208 hours were required to reach an acid concentration in the range of 95 to 96% in the anode compartment. In Example 3, in which the anode and cathode temperatures were about the same, it required more than 168 hours to reach an acid concentration of 95 to 96% in the anode compartment. Summarizing the data, it has been shown that operating with the anode compartment about 15 to 20° F. higher than the cathode compartment reduces the time required to bring the acidity of the anolyte up to about 95 to 96% by about one-third as compared to operating with temperatures of both compartments at the same level. Operating with the anode compartment about 30° F. higher than the cathode compartment results in a reduction in the time required of about one-half.

I claim:

1. In a method for the regeneration of spent alkylation sulfuric acid having an acid concentration of 80% to 90% and the balance consisting primarily of hydrocarbon-containing contaminants wherein the spent acid is electrolyzed in a compartmented electrolytic cell and the reconcentrated sulfuric acid is recovered from the anode compartment of the cell, the improvement which comprises maintaining the temperature of the acid in the anode compartment from about 15° to about 75° higher than the temperature of the acid in the cathode compartment, the initial temperature of the electrolysis being less than about 60° F. in the cathode compartment and less than about 90° F. in the anode compartment and the final temperature of the electrolysis being less than about 150° F. in the anode compartment.

2. A method according to claim 1 wherein the temperature of the acid in the anode compartment is maintained from about 15° F. to about 30° F. higher than the temperature of the acid in the cathode compartment of the cell.

References Cited in the file of this patent

UNITED STATES PATENTS

| 1,630,074 | Rogers | May 24, 1927 |
| 2,618,592 | Horvitz | Nov. 18, 1952 |

FOREIGN PATENTS

| 127,985 | Germany | Feb. 5, 1902 |
| 226,002 | Switzerland | July 1, 1943 |